United States Patent
Tanaka

(10) Patent No.: US 12,313,415 B2
(45) Date of Patent: May 27, 2025

(54) APPARATUS, METHOD, AND COMPUTER PROGRAM FOR COLLECTING FEATURE DATA

(71) Applicant: TOYOTA JIDOSHA KABUSHIKI KAISHA, Toyota (JP)

(72) Inventor: Masahiro Tanaka, Tokyo-to (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 205 days.

(21) Appl. No.: 17/851,876

(22) Filed: Jun. 28, 2022

(65) Prior Publication Data
US 2023/0023095 A1  Jan. 26, 2023

(30) Foreign Application Priority Data

Jul. 13, 2021 (JP) .................. 2021-115941

(51) Int. Cl.
  *G01C 21/34* (2006.01)
  *G01C 21/00* (2006.01)
  *G07C 5/00* (2006.01)

(52) U.S. Cl.
  CPC ..... *G01C 21/3469* (2013.01); *G01C 21/3826* (2020.08); *G01C 21/3841* (2020.08); *G01C 21/3889* (2020.08); *G01C 21/3896* (2020.08); *G07C 5/008* (2013.01)

(58) Field of Classification Search
  CPC ............ G01C 21/3469; G01C 21/3826; G01C 21/3841; G01C 21/3889; G01C 21/3896; G01C 21/3822; G07C 5/008; G07C 5/0808; B60W 60/001; B60W 2556/45
  See application file for complete search history.

(56) References Cited

U.S. PATENT DOCUMENTS

| | | | |
|---|---|---|---|
| 2009/0076774 A1* | 3/2009 | Miyajima | ............ G08G 1/0104 702/179 |
| 2017/0160096 A1* | 6/2017 | Davidson | ........... G06Q 10/0631 |
| 2019/0316915 A1 | 10/2019 | Koda et al. | |
| 2020/0292332 A1 | 9/2020 | Sakurada et al. | |
| 2021/0180963 A1 | 6/2021 | Nomura | |
| 2022/0028254 A1 | 1/2022 | Ogawa et al. | |

FOREIGN PATENT DOCUMENTS

| | | | |
|---|---|---|---|
| JP | 2018112838 A | * | 7/2018 |
| JP | 2020-035321 A | | 3/2020 |
| WO | 2017/212639 A1 | | 12/2017 |
| WO | 2020/111133 A1 | | 6/2020 |

* cited by examiner

*Primary Examiner* — Anne Marie Antonucci
*Assistant Examiner* — Jewel Ashley Kuntz
(74) *Attorney, Agent, or Firm* — Oliff PLC

(57) ABSTRACT

An apparatus for collecting feature data includes a memory configured to store, for each of vehicles, a mileage of the vehicle or the amount of feature data transmitted by the vehicle and representing a feature related to travel of the vehicles; and one or more processors configured to set a transmission condition for permitting transmission of the feature data for each of the vehicles so that, of the vehicles, the transmission condition for a vehicle with a lower mileage or a vehicle having transmitted a smaller amount of the feature data is more relaxed, and notify each of the vehicles via a communication circuit of a collection instruction to instruct the vehicle to collect the feature data under the transmission condition set for the vehicle.

6 Claims, 7 Drawing Sheets

APPARATUS, METHOD, AND COMPUTER PROGRAM FOR COLLECTING FEATURE DATA

FIELD

The present invention relates to an apparatus, a method, and a computer program for collecting data of features represented in a map.

BACKGROUND

High-precision maps to which an autonomous vehicle-driving system refers for autonomous driving control of a vehicle are required to accurately represent information on those features on or around roads which relate to travel of vehicles. Thus, a technique to collect data representing features from vehicles actually traveling on roads has been proposed (see International Publication No. 2017/212639).

In the technique disclosed in International Publication No. 2017/212639, a server device includes a storage unit that stores an advanced map including feature information on features. The server device receives difference information indicating the difference between feature information and an actual feature corresponding to the feature information from vehicle-mounted devices each equipped with an external sensor for measuring features. The server device transmits a raw-data request signal for requesting transmission of raw measurement data of the actual feature to a vehicle-mounted device, depending on reliability calculated on the basis of multiple pieces of difference information.

SUMMARY

As feature-representing data transmitted from vehicles to a server increases, cost of wireless communication for collecting the data also increases. In particular, of these vehicles, the unit cost of communication of a vehicle that communicates more than a certain amount may be set higher than that of another vehicle that communicates less than this amount. For this reason, it is desirable to equalize the amount of feature-representing data transmitted from each vehicle to the server.

It is an object of the present invention to provide an apparatus for collecting feature data that can equalize the amount of transmitted feature data among vehicles.

According to an embodiment, an apparatus for collecting feature data is provided. The apparatus includes a memory configured to store, for each of vehicles, a mileage of the vehicle or the amount of feature data transmitted by the vehicle and representing a feature related to travel of the vehicles; and one or more processors configured to: set a transmission condition for permitting transmission of the feature data for each of the vehicles so that, of the vehicles, the transmission condition for a vehicle with a lower mileage or a vehicle having transmitted a smaller amount of the feature data is more relaxed, and notify each of the vehicles via a communication circuit of a collection instruction to instruct the vehicle to collect the feature data under the transmission condition set for the vehicle.

The one or more processors of the apparatus preferably set the transmission condition so as to permit, of the vehicles, a vehicle with a lower mileage or a vehicle having transmitted a smaller amount of the feature data to transmit the feature data of up to a region with more traffic of target regions for collecting the feature data.

In this case, the one or more processors are preferably further configured to classify the vehicles into mileage ranks according to mileages of the vehicles, and classify the regions into traffic ranks according to the traffic in the regions. The one or more processors preferably set the transmission condition for each of the vehicles so as to permit a vehicle belonging to one of the mileage ranks with a lower average mileage to transmit the feature data of up to a region belonging to one of the traffic ranks with more traffic.

Alternatively, for each of target regions for collecting the feature data, the memory preferably further stores the amount of the feature data received from any of the vehicles in a predetermined period and a target amount of the feature data to be collected. The one or more processors preferably set the transmission condition so as to permit, of the vehicles, a vehicle with a lower mileage or a vehicle having transmitted a smaller amount of the feature data to transmit the feature data of up to one of the regions regarding which the ratio of the amount of the received feature data to the target amount is higher.

According to another embodiment, a method for collecting feature data is provided. The method includes setting a transmission condition for permitting transmission of feature data for each of vehicles so that, of the vehicles, the transmission condition for a vehicle with a lower mileage or a vehicle having transmitted a smaller amount of the feature data is more relaxed; and notifying each of the vehicles via a communication circuit of a collection instruction to instruct the vehicle to collect the feature data under the transmission condition set for the vehicle. The feature data represents a feature related to travel of vehicles.

According to still another embodiment, a non-transitory recording medium that stores a computer program for collecting feature data is provided. The computer program includes instructions causing a computer to execute a process including setting a transmission condition for permitting transmission of feature data for each of vehicles so that, of the vehicles, the transmission condition for a vehicle with a lower mileage or a vehicle having transmitted a smaller amount of the feature data is more relaxed; and notifying each of the vehicles via a communication circuit of a collection instruction to instruct the vehicle to collect the feature data under the transmission condition set for the vehicle. The feature data represents a feature related to travel of vehicles.

The apparatus according to the present invention has an advantageous effect of being able to equalize the amount of transmitted feature data among vehicles.

DESCRIPTION OF EMBODIMENTS

An apparatus for collecting feature data, a method for collecting feature data executed by the apparatus, and a computer program for collecting feature data will now be described with reference to the attached drawings. Regarding multiple regions represented in a map to be generated or updated, the apparatus collects data representing a feature related to travel of vehicles (hereafter, "feature data") from multiple vehicles that can communicate.

The distance traveled in a certain period varies from vehicle to vehicle; if vehicles transmit feature data under the same condition, a vehicle with a higher mileage will generally transmit more feature data. Thus, a vehicle with a high mileage incurs a high cost of wireless communication. A maximum amount of data that can be communicated by wireless may be set to equalize the amount of transmitted feature data among vehicles; however, a vehicle with a high mileage probably travels on roads that are not traveled by other vehicles and whose feature data is not easily collected. For this reason, if transmission of feature data from a vehicle with a high mileage is restricted, it will become more difficult to collect feature data of roads whose feature data is not easily collected.

Thus the apparatus for collecting feature data stores mileages of respective vehicles, and sets a transmission condition for permitting transmission of feature data for each vehicle so that the transmission condition for a vehicle with a lower mileage is more relaxed. The apparatus then notifies each vehicle via a communication unit of a collection instruction to instruct the vehicle to collect the feature data under the set transmission condition. In particular, the apparatus sets the transmission condition regarding a geographical area. In the present embodiment, the apparatus ranks target regions for collecting feature data represented in a map to be generated or updated, according to traffic. Additionally, the apparatus increases the maximum traffic of a rank of regions where a vehicle is permitted to transmit feature data as the mileage of the vehicle decreases.

Features to be detected include various signposts, various road markings, traffic lights, and other features related to travel of vehicles.

Figure 1:
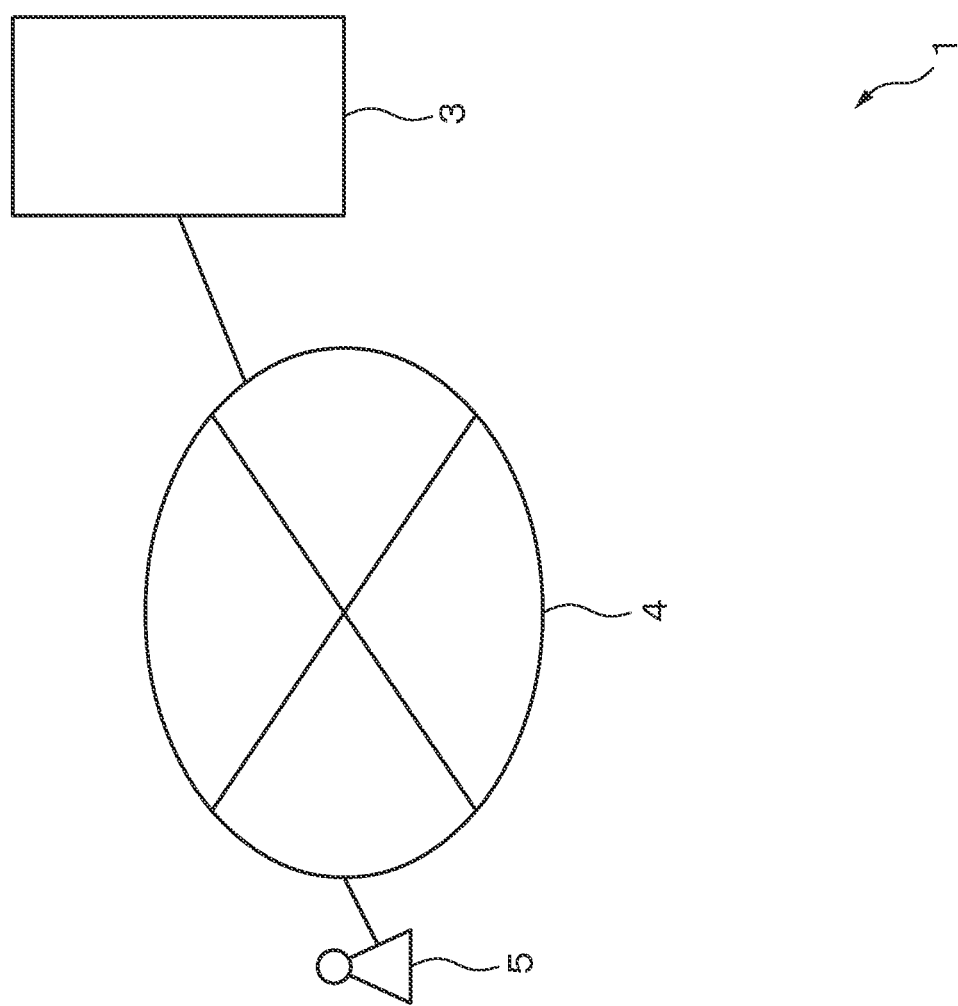
FIG. 1 schematically illustrates the configuration of a system for collecting feature data equipped with an apparatus for collecting feature data.
Figure 1:
Figure 1:
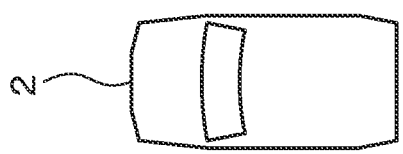

FIG. 1 schematically illustrates the configuration of a system for collecting feature data equipped with the apparatus for collecting feature data. In the present embodiment, the system 1 for collecting feature data includes multiple vehicles 2 and a server 3, which is an example of the apparatus for collecting feature data. Each vehicle 2 accesses a wireless base station 5, which is connected, for example, via a gateway (not illustrated) to a communication network 4 connected with the server 3, thereby connecting to the server 3 via the wireless base station 5 and the communication network 4. For simplicity, FIG. 1 illustrates only a single vehicle 2. FIG. 1 also illustrates only a single wireless base station 5, but the communication network 4 may be connected with multiple wireless base stations 5. Additionally, the server 3 may be connected to a traffic information server (not illustrated) that manages traffic information so that they can communicate via the communication network.

In the present embodiment, the vehicles 2 have the same configuration and functions concerning collection of feature data. Thus the following describes a single vehicle 2.

Figure 2:
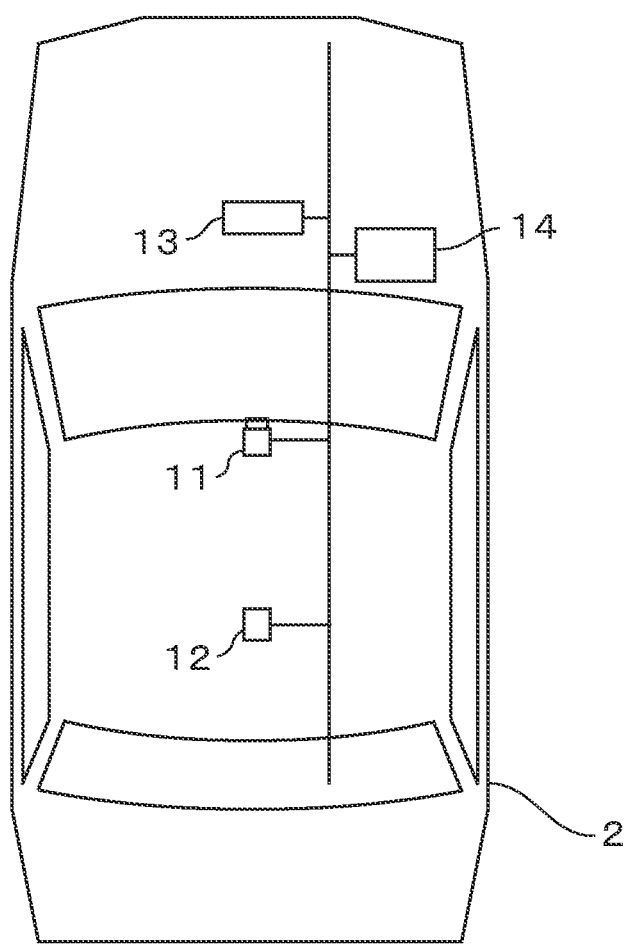
FIG. 2 schematically illustrates the configuration of a vehicle.

FIG. 2 schematically illustrates the configuration of a vehicle 2. The vehicle 2 includes a camera 11, a GPS receiver 12, a wireless communication terminal 13, and a data acquisition device 14, which are connected so that they can communicate via an in-vehicle network conforming to a standard, such as a controller area network. The vehicle 2 may further include a navigation device (not illustrated) for searching for a planned travel route of the vehicle 2 and for navigating so that the vehicle 2 may travel along the planned travel route.

The camera 11, which is an example of an image capturing unit for capturing the surroundings of the vehicle 2, includes a two-dimensional detector constructed from an array of optoelectronic transducers, such as CCD or C-MOS, having sensitivity to visible light and a focusing optical system that forms an image of a target region on the two-dimensional detector. The camera 11 is mounted, for example, in the interior of the vehicle 2 so as to be oriented, for example, to the front of the vehicle 2. The camera 11 captures a region in front of the vehicle 2 every predetermined capturing period (e.g., 1/30 to 1/10 seconds), and generates images of this region. The images obtained by the camera 11 may be color or grayscale images. The vehicle 2 may include multiple cameras 11 whose imaging directions or focal lengths differ.

Whenever generating an image, the camera 11 outputs the generated image to the data acquisition device 14 via the in-vehicle network.

The GPS receiver 12 receives GPS signals from GPS satellites at predetermined intervals, and determines the position of the vehicle 2, based on the received GPS signals. The GPS receiver 12 outputs positioning information indicating the result of determination of the position of the vehicle 2 based on the GPS signals to the data acquisition device 14 via the in-vehicle network at predetermined intervals. The vehicle 2 may include a receiver conforming to a satellite positioning system other than the GPS receiver 12. In this case, this receiver determines the position of the vehicle 2.

The wireless communication terminal 13, which is an example of a communication unit, is a device to execute a wireless communication process conforming to a predetermined standard of wireless communication, and accesses, for example, the wireless base station 5 to connect to the server 3 via the wireless base station 5 and the communication network 4. The wireless communication terminal 13 generates an uplink radio signal including, for example, feature data or travel information indicating the mileage of the vehicle 2 received from the data acquisition device 14, and transmits the uplink radio signal to the wireless base station 5 to transmit, for example, the feature data and the travel information to the server 3. Additionally, the wireless communication terminal 13 receives a downlink radio signal from the wireless base station 5, and passes, for example, a collection instruction from the server 3 included in the radio signal to the data acquisition device 14 or to an electronic control unit (ECU) (not illustrated) that controls travel of the vehicle 2.

Figure 3:
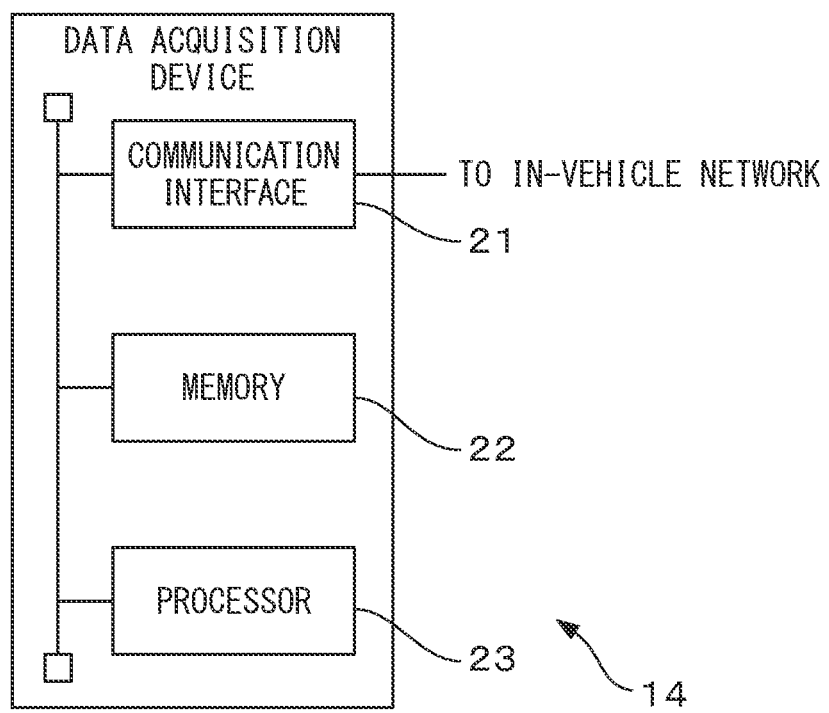
FIG. 3 illustrates the hardware configuration of a data acquisition device.

FIG. 3 illustrates the hardware configuration of the data acquisition device. The data acquisition device 14 generates feature data, based on an image generated by the camera 11, and further generates travel information of the vehicle 2. To achieve this, the data acquisition device 14 includes a communication interface 21, a memory 22, and a processor 23.

The communication interface 21, which is an example of an in-vehicle communication unit, includes an interface circuit for connecting the data acquisition device 14 to the in-vehicle network. In other words, the communication interface 21 is connected to the camera 11, the GPS receiver 12, and the wireless communication terminal 13 via the in-vehicle network. Whenever receiving an image from the camera 11, the communication interface 21 passes the received image to the processor 23. Whenever receiving positioning information from the GPS receiver 12, the communication interface 21 passes the received positioning information to the processor 23. Additionally, the communication interface 21 outputs feature data and travel information received from the processor 23 to the wireless communication terminal 13 via the in-vehicle network.

The memory 22 includes, for example, volatile and nonvolatile semiconductor memories. The memory 22 may further include other storage, such as a hard disk drive. The memory 22 stores various types of data used in a process related to generation of feature data, which is executed by the processor 23 of the data acquisition device 14. Such data includes, for example, a road map; identifying information of the vehicle 2; parameters of the camera 11, such as the height of the mounted position, the imaging direction, and the angle of view of the camera 11; and a set of parameters for defining a classifier for detecting a feature from an image. The road map may be, for example, a map used by the navigation device, and includes information on the positions and the lengths of road sections included in the region represented in the road map as well as the connection relationship between road sections at individual intersections in this region. The memory 22 may also store images received from the camera 11 and positioning information received from the GPS receiver 12 for a certain period. Additionally, the memory 22 stores information indicating a target region for generating and collecting feature data (hereafter, a "collection target region") specified in a collection instruction to collect feature data. The memory 22 may further store computer programs for various processes executed by the processor 23.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 stores images received from the camera 11 and positioning information received from the GPS receiver 12 in the memory 22. Additionally, the processor 23 executes the process related to generation of feature data at predetermined intervals (e.g., 0.1 to 10 seconds) during travel of the vehicle 2.

As the process related to generation of feature data, for example, the processor 23 determines whether the position of the vehicle 2 indicated by positioning information received from the GPS receiver 12 is within a collection target region. When the position of the vehicle is within a collection target region, the processor 23 generates feature data, based on an image received from the camera 11.

For example, the processor 23 uses an image itself received from the camera 11 (hereafter, a "whole image") as the feature data. Alternatively, the processor 23 cuts out a sub-image including a region representing a road surface from a whole image received from the camera 11, and uses the cut-out sub-image as the feature data. Information indicating a region supposed to represent a road surface in a whole image may be prestored in the memory 22. The processor 23 may refer to this information to identify the region to be cut out from a whole image.

Alternatively, the processor 23 may input a whole image or a sub-image into a classifier that has been trained to detect a detection target feature, thereby detecting a feature represented in the inputted whole image or sub-image (hereafter simply the "input image"). The processor 23 may generate information indicating the type of the detected feature as feature data. As such a classifier, the processor 23 may use, for example, a deep neural network (DNN) that has been trained to detect from an input image a feature represented in the image. As such a DNN, for example, a DNN having a convolutional neural network (CNN) architecture, e.g., Single Shot MultiBox Detector (SSD) or Faster R-CNN, is used. In this case, for each type of detection target feature (e.g., a lane-dividing line, a pedestrian crossing, and a stop line), the classifier calculates a confidence score indicating how likely the feature is represented in a region in the input image; the classifier calculates the confidence score for each of various regions in the input image. The classifier determines that the region where the confidence score for a certain type of feature is not less than a predetermined detection threshold represents this type of feature. The classifier then outputs information indicating a region including a detection target feature in the input image, e.g., a circumscribed rectangle of the detection target feature (hereafter, an "object region") and information indicating the type of the feature represented in the object region. The processor 23 generates feature data so as to include the information indicating the type of the feature represented in the detected object region.

Additionally, the processor 23 identifies the real-space position of the location or the feature indicated by feature data, and includes information indicating this position in the feature data. For example, the processor 23 uses the position of the vehicle 2 at the time of generation of the image used for generating feature data as the position of the location indicated by the feature data. To this end, the processor 23 can use the position indicated by positioning information received from the GPS receiver 12 at the timing closest to the time of generation of the image used for generating the feature data as the position of the vehicle 2. Alternatively, in the case that the ECU (not illustrated) estimates the position of the vehicle 2, the processor 23 may obtain information indicating the estimated position of the vehicle 2 from the ECU via the communication interface 21. The processor 23 further obtains information indicating the travel direction of the vehicle 2 from the ECU (not illustrated). Additionally, the positions of pixels in an image correspond one-to-one to the directions from the camera 11 to objects represented in the respective pixels. Thus, when the feature data is a whole image or a sub-image, the processor 23 may estimate the real-space position corresponding to the center of the whole image or the sub-image as the position of the location indicated by the feature data. In this case, the processor 23 estimates the position of the location corresponding to the center of the whole image or the sub-image, based on the direction with respect to the camera 11, the position and the travel direction of the vehicle 2, and the parameters of the camera 11, such as the imaging direction, the angle of view, and the height of the mounted position. Alternatively, when the feature data includes information indicating the type of detected feature, the processor 23 estimates the position of the feature represented in the detected object region, based on the direction from the camera 11 to the position corresponding to the centroid of the object region, the position and the travel direction of the vehicle 2, and the parameters of the camera 11. Alternatively, the processor 23 may estimate the position of a feature indicated by feature data by "structure from motion (SfM)." In this case, the processor 23 associates object regions representing the same feature in two images obtained at different timings with each other, using optical flow. The processor 23 can estimate the position of the feature by triangulation, based on the positions and the travel directions of the vehicle 2 at the times of acquisition of the two images, the parameters of the camera 11, and the positions of the object regions in the respective images.

The processor 23 includes, in feature data, the latitude and longitude indicating the position of the location or the feature represented in the feature data as information indicating the position of the location or the feature represented in the feature data. Additionally, the processor 23 refers to the road map to identify a link that is a road section including the position of the location or the feature represented in the feature data or a road section closest to this position. The processor 23 may include the identification number of the identified link in the feature data. Further, when the feature data is a whole image or a sub-image, the processor 23 may include the position and the travel direction of the vehicle 2 at the time of generation of the image and the parameters of the camera 11 in the feature data so that the server 3 can estimate the position of the feature represented in the whole image or the sub-image.

The processor 23 may generate two or more types of feature data selected from among a whole image, a sub-image, and information indicating the type of feature. The processor 23 may change the type of feature data to be generated, depending on the position of the vehicle 2 at the time of generation of the feature data. In this case, type-specifying information for specifying the type of feature data to be collected for each collection target region is included in collection instructions received from the server 3. The processor 23 refers to the type-specifying information to identify the type of feature data to be generated. Alternatively, the type of feature data to be generated may be changed depending on road environment around the vehicle 2. For example, the processor 23 may select, as feature data, a whole image when the vehicle 2 is within a predetermined area around an intersection, and a sub-image or information indicating the type of feature when the vehicle 2 is outside the predetermined area. In this case, the processor 23 refers to the position of the vehicle 2 and the road map stored in the memory 22 to determine whether the vehicle 2 is within a predetermined area around an intersection.

The processor 23 further includes the identifying information of the vehicle 2 in feature data. Whenever generating feature data, the processor 23 outputs the generated feature data to the wireless communication terminal 13 via the communication interface 21. In this way, feature data is transmitted to the server 3.

Additionally, the processor 23 generates travel information at predetermined timing. The predetermined timing may be, for example, the timing when the ignition switch of the vehicle 2 is turned off. In this case, when the ignition switch of the vehicle 2 is turned on, the processor 23 obtains information indicating the total mileage of the vehicle 2 from the ECU (not illustrated), and stores it in the memory 22 as the total mileage at the start of travel. Thereafter, when the ignition switch of the vehicle 2 is turned off, the processor 23 obtains information indicating the total mileage of the vehicle 2 again from the ECU, and determines it as the total mileage at the end of travel. The processor 23 then generates travel information so as to include therein the difference between the total mileages at the end and the start of travel as the mileage of this time. Additionally, the processor 23 includes the date when the travel information is generated and the identifying information of the vehicle 2 in the travel information. Whenever generating travel information, the processor 23 outputs the generated travel information to the wireless communication terminal 13 via the communication interface 21. In this way, travel information is transmitted to the server 3. The travel information may be generated by the ECU and transmitted to the server 3 via the wireless communication terminal 13.

Figure 4:
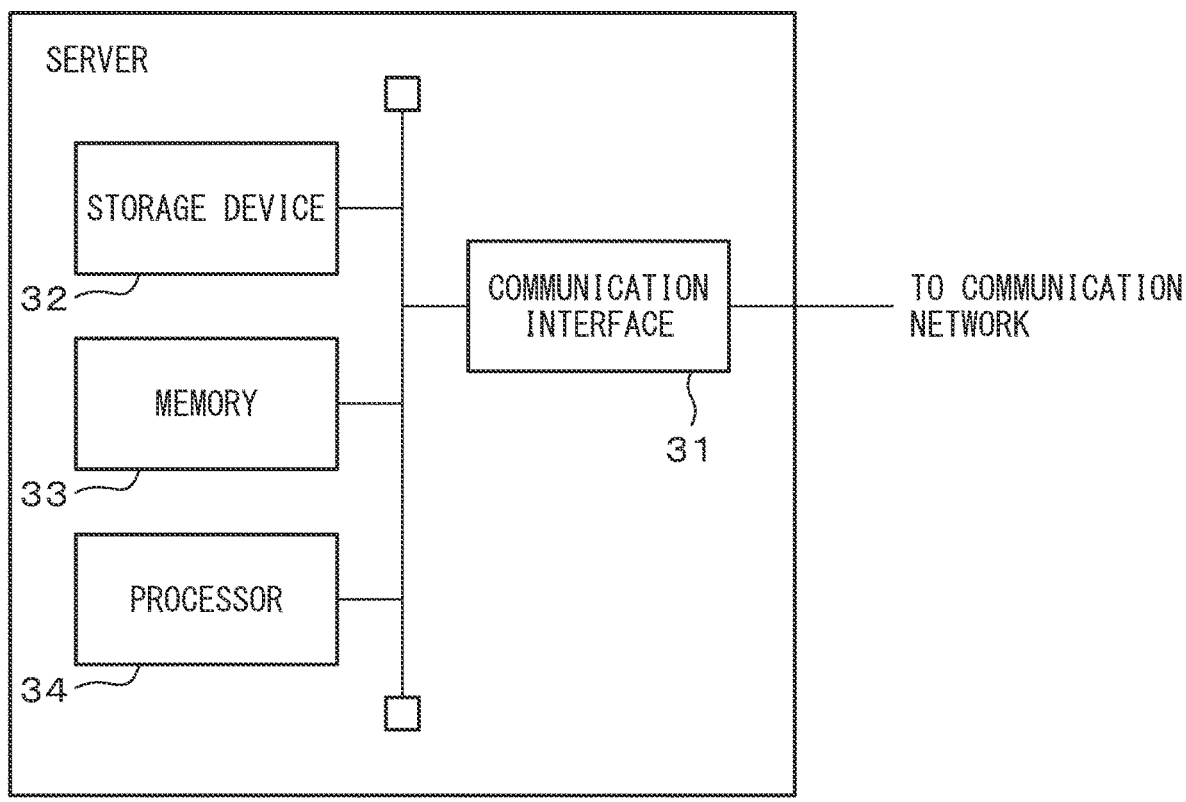
FIG. 4 illustrates the hardware configuration of a server, which is an example of the apparatus for collecting feature data.

The following describes the server 3, which is an example of the apparatus for collecting feature data. FIG. 4 illustrates the hardware configuration of the server 3, which is an example of the apparatus for collecting feature data. The server 3 includes a communication interface 31, a storage device 32, a memory 33, and a processor 34. The communication interface 31, the storage device 32, and the memory 33 are connected to the processor 34 via a signal line. The server 3 may further include an input device, such as a keyboard and a mouse, and a display device, such as a liquid crystal display.

The communication interface 31, which is an example of the communication unit, includes an interface circuit for connecting the server 3 to the communication network 4. The communication interface 31 is configured so that the communication interface 31 can communicate with the vehicles 2 via the communication network 4 and the wireless base station 5. More specifically, the communication interface 31 passes to the processor 34 feature data and travel information received from the vehicles 2 via the wireless base station 5 and the communication network 4. Additionally, the communication interface 31 transmits a collection instruction received from the processor 34 to the vehicles 2 via the communication network 4 and the wireless base station 5. Additionally, the communication interface 31 receives traffic information from the traffic information server (not illustrated) via the communication network 4, and passes the traffic information to the processor 34.

The storage device 32, which is an example of the storage unit, includes, for example, a hard disk drive, or an optical recording medium and an access device therefor. The storage device 32 stores various types of data and information used in a process for collecting map data. For example, the storage device 32 stores a map to be updated, the traffic information, and the identifying information of each vehicle 2. The storage device 32 further stores feature data and travel information received from each vehicle 2. The storage device 32 may further store a computer program executed by the processor 34 for executing a feature data collection process.

The memory 33, which is another example of the storage unit, includes, for example, nonvolatile and volatile semiconductor memories. The memory 33 temporarily stores various types of data generated during execution of the feature data collection process.

The processor 34, which is an example of a control unit, includes one or more central processing units (CPUs) and a peripheral circuit thereof. The processor 34 may further include another operating circuit, such as a logic-arithmetic unit or an arithmetic unit. The processor 34 executes the feature data collection process.

Figure 5:
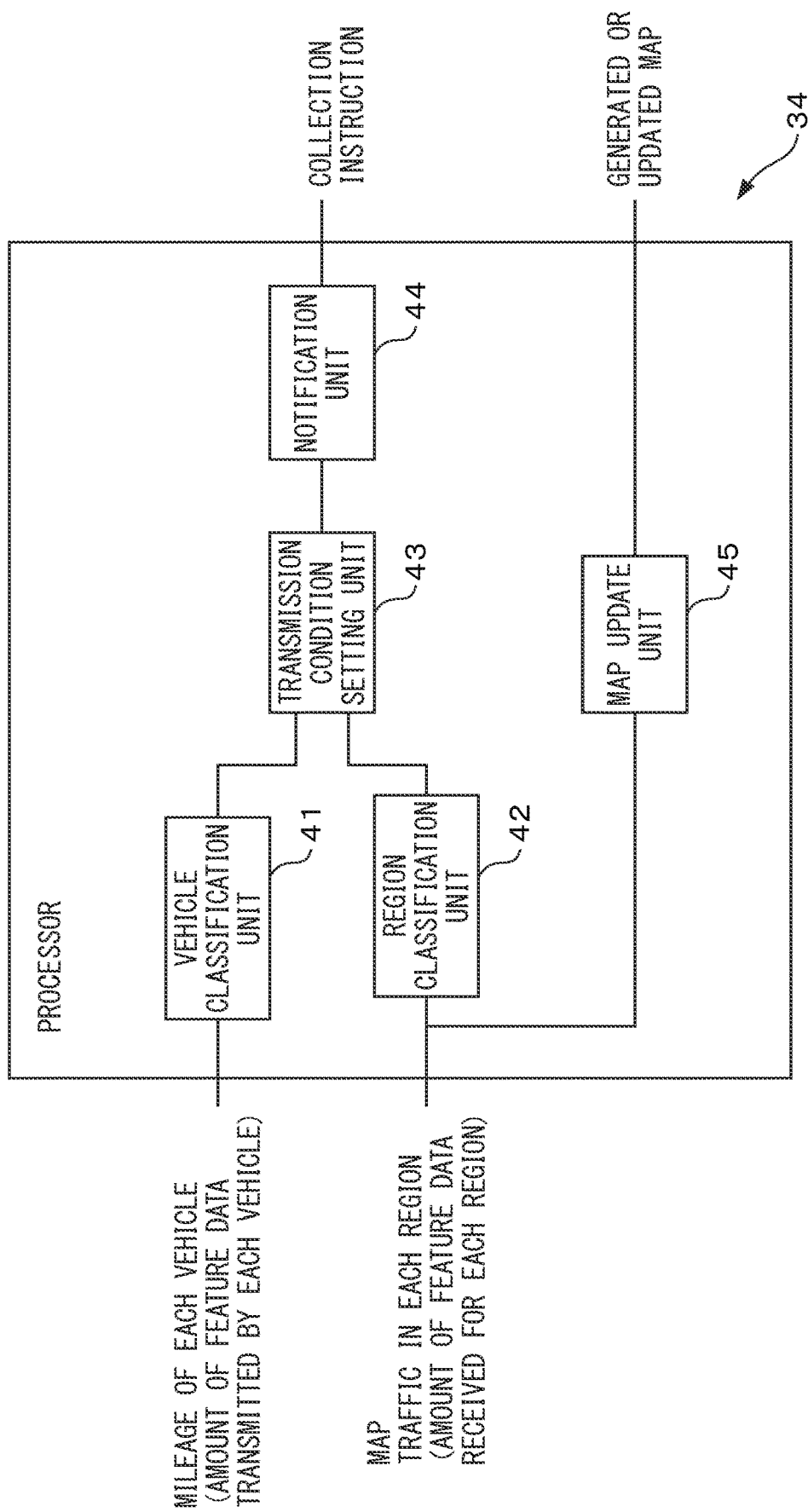
FIG. 5 is a functional block diagram of a processor of the server, related to a feature data collection process.

FIG. 5 is a functional block diagram of the processor 34, related to the feature data collection process. The processor 34 includes a vehicle classification unit 41, a region classification unit 42, a transmission condition setting unit 43, a notification unit 44, and a map update unit 45. These units included in the processor 34 are functional modules, for example, implemented by a computer program executed by the processor 34, or may be dedicated operating circuits provided in the processor 34.

The vehicle classification unit 41 classifies the vehicles 2 into multiple ranks according to mileages in a preceding predetermined period (e.g., a week or a month) (these ranks will hereafter be referred to as "mileage ranks" for convenience of description). For each vehicle 2, the vehicle classification unit 41 refers to the travel information stored in the storage device 32 to calculate the sum of the distances traveled at times of driving in the preceding predetermined period as the mileage in the predetermined period.

For example, the vehicle classification unit 41 sets the boundaries of the mileage ranks so that each mileage rank includes the same number of vehicles 2. For example, when classifying the vehicles 2 into three mileage ranks, the vehicle classification unit 41 classifies the vehicles 2 into first to third mileage ranks in ascending order of mileage so that each rank includes one-third of all the vehicles 2. The vehicle classification unit 41 may set the mileage ranks so that each rank includes a different number of vehicles 2. For example, the vehicle classification unit 41 may set the mileage ranks so that the first mileage rank includes the smallest number of vehicles 2 and that the second or third mileage rank includes the largest number of vehicles 2. Conversely, the vehicle classification unit 41 may set the mileage ranks so that the third mileage rank includes the smallest number of vehicles 2 and that the first or second mileage rank includes the largest number of vehicles 2. Additionally, the number of mileage ranks is not limited to three, and may be set at any number not less than two, e.g., four or five.

When classifying the vehicles 2 into the mileage ranks, the vehicle classification unit 41 calculates, for each mileage rank, the average of the mileages of the vehicles 2 belonging to the mileage rank. The vehicle classification unit 41 then notifies the transmission condition setting unit 43 of the mileage ranks to which the respective vehicles 2 belong. The vehicle classification unit 41 also notifies the region classification unit 42 of the average mileages of the respective mileage ranks.

The region classification unit 42 classifies multiple regions represented in the map to be generated or updated, i.e., target regions for collecting feature data, according to traffic. In the following description, the target regions for collecting feature data will be simply referred to as regions.

The regions are set, for example, by dividing the whole region represented in the map to be generated or updated into a grid of regions of predetermined lengths (e.g., several dozen to hundred meters). However, each region is not limited to this example, and may be set so that its area decreases as the density of roads in the region increases. Alternatively, each region may be set so that its area decreases as the density of a particular structure of roads (e.g., intersections or junctions) in the region increases. Alternatively, each region may be set so as to include a single road section or intersection.

In the present embodiment, the region classification unit 42 refers to the traffic information received from the traffic information server via the communication network 4 or read from the storage device 32. The traffic information includes traffic in a predetermined period (e.g., the latest day, week, or month) on a region-by-region basis. The traffic in each region may be, for example, the average of the numbers of vehicles having past one or more respective locations in the region or their maximum.

The region classification unit 42 classifies the regions into multiple ranks according to the traffic in the regions (these ranks will hereafter be referred to as "traffic ranks" for convenience of description). For example, the region classification unit 42 sets the same number of traffic ranks as the number of mileage ranks. Additionally, the region classification unit 42 sets the traffic ranks so that the ratio of the number of regions of up to a predetermined traffic rank in ascending order of traffic to the total number of regions will equal to the ratio of the average mileage of the predetermined mileage rank to the average mileage of the mileage rank with the highest mileage. For example, when the ratio between the average mileages of three mileage ranks is 1:3:10, the region classification unit 42 sets traffic rank 1 with the least traffic so that the ratio of the number of regions included in traffic rank 1 to the total number of regions will be 1/10. The region classification unit 42 sets traffic rank 2 with the second least traffic so that the ratio of the sum of the number of regions included in traffic rank 1 with the least traffic and that of regions in traffic rank 2 to the total number of regions will be 3/10. The region classification unit 42 sets traffic rank 3 with the most traffic so that the sum of the numbers of regions included in traffic ranks 1, 2, and 3 will equal the total number of regions. The region classification unit 42 then classifies the regions into traffic ranks 1 to 3 in ascending order of traffic. This classification of the regions facilitates further equalizing the amount of feature data transmitted by each vehicle 2.

The region classification unit 42 may rank the regions at a ratio different from the above. For example, the region classification unit 42 may classify the regions into the traffic ranks in ascending order of traffic so that each traffic rank includes the same number of regions. The region classification unit 42 may set the traffic ranks so that the number thereof differs from that of mileage ranks.

The region classification unit 42 notifies the transmission condition setting unit 43 of the traffic ranks to which the respective regions belong.

The transmission condition setting unit 43 sets a transmission condition of feature data for permitting transmission of feature data for each vehicle 2 so that, of the vehicles 2, the transmission condition for a vehicle 2 with a lower mileage is more relaxed. In the present embodiment, the transmission condition setting unit 43 sets a transmission condition for each vehicle 2 so that a vehicle 2 with a lower mileage is permitted to transmit feature data of a larger geographical area. In other words, collection target regions are set for each vehicle 2 according to the mileage of the vehicle 2.

For example, the transmission condition setting unit 43 permits a vehicle 2 of interest belonging to a mileage rank with a lower average mileage to transmit feature data of up to a region belonging to a traffic rank with more traffic. Assume that the vehicles 2 are classifies into three mileage ranks (mileage ranks 1 to 3) in ascending order of mileage, and that the regions are classified into three traffic ranks (traffic ranks 1 to 3) in ascending order of traffic, as described above. In this case, the transmission condition setting unit 43 permits the vehicles 2 belong to mileage rank 1 with the lowest mileage to transmit feature data of all the regions. The transmission condition setting unit 43 permits the vehicles 2 belonging to mileage rank 2 with the second lowest mileage to transmit feature data of the regions belong to any of the two traffic ranks in ascending order of traffic (traffic ranks 1 and 2). Additionally, the transmission condition setting unit 43 permits the vehicles 2 belonging to mileage rank 3 with the highest mileage to transmit feature data of the regions belonging to traffic rank 1 with the least traffic only. By setting a transmission condition of feature data for each vehicle 2 in this way, the transmission condition setting unit 43 can equalize the amount of transmitted feature data among the vehicles 2. Additionally, since a vehicle 2 with a high mileage is permitted to transmit feature data of roads with little traffic, i.e., roads whose feature data is not easily collected, the transmission condition setting unit 43 can prevent difficulty in collecting feature data of roads with little traffic from increasing.

Figure 6:
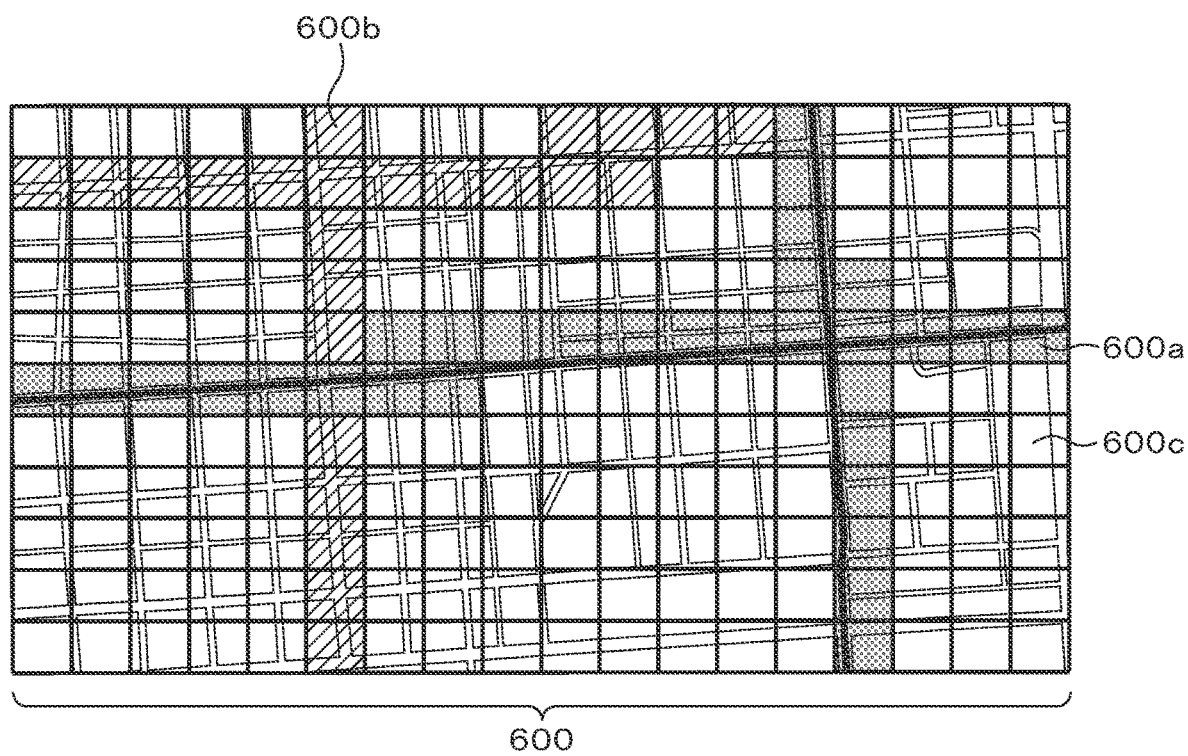
FIG. 6 illustrates an example of the relationship between traffic ranks set for regions and mileage ranks whose vehicles are permitted to transmit feature data.

FIG. 6 illustrates an example of the relationship between traffic ranks set for regions and mileage ranks whose vehicles are permitted to transmit feature data. As illustrated in FIG. 6, a map to be generated or updated represents grid-like regions 600. Of the regions 600, dotted regions 600a are classified as traffic rank 3 with the most traffic of three traffic ranks 1 to 3. Of the regions 600, hatched regions 600b are classified as traffic rank 2 with the second most traffic of three traffic ranks 1 to 3. Of the regions 600, the other regions 600c are classified as traffic rank 1 with the least traffic. Hence, of three mileage ranks 1 to 3, the vehicles 2 belonging to mileage rank 3 with the highest mileage are permitted to transmit feature data of the regions 600c only of the regions 600. The vehicles 2 belonging to mileage rank 2 with the second highest mileage are permitted to transmit feature data of the regions 600b and 600c of the regions 600. The vehicles 2 belonging to mileage rank 1 with the lowest mileage are permitted to transmit feature data of all the regions 600.

When the number of mileage ranks differs from that of traffic ranks, a reference table representing, for each mileage rank, a traffic rank regarding which transmission of feature data is permitted, is prepared and stored in the storage device 32. The transmission condition setting unit 43 refers to the reference table to identify, for each mileage rank, the traffic rank including regions where the vehicles 2 belonging to the mileage rank are permitted to transmit feature data.

For each vehicle 2, the transmission condition setting unit 43 sets some of the regions where the vehicle 2 is permitted to transmit feature data as collection target regions. The transmission condition setting unit 43 then notifies the notification unit 44 of information indicating the collection target regions set for each vehicle 2.

The notification unit 44 generates, for each vehicle 2, a collection instruction to instruct the vehicle to collect feature data under the transmission condition set for the vehicle 2. In the present embodiment, since collection target regions are set as the transmission condition, the notification unit 44 generates, for each vehicle 2, a collection instruction including information for identifying the collection target regions set for the vehicle 2. The notification unit 44 may further include information indicating the type of feature data to be collected in the collection instruction. In this case, the information indicating the type of feature data to be collected is inputted in advance for each region with an input device (not illustrated) and stored in the storage device 32. For each vehicle 2, the notification unit 44 refers to the identifying information of the vehicle 2, and transmits the collection instruction generated for the vehicle 2 to the vehicle 2 via the communication interface 31.

The notification unit 44 may also transmit the generated or updated map to each vehicle 2 via the communication interface 31.

The map update unit 45 generates or updates the map read from the storage device 32, based on collected feature data. For example, when the feature data is a whole image or a sub-image, the map update unit 45 detects a feature and its type from the whole image or the sub-image and estimates the position of the detected feature by executing the same process as is executed by the data acquisition device 14 mounted on the vehicle 2. For features of the same type in a predetermined area, the map update unit 45 identifies the average of the positions of the features included in the collected feature data or estimated as described above as the position of the features. For each feature whose position is identified, the map update unit 45 includes information indicating the type and the identified position of the feature in the map to generate or update the map.

Figure 7:
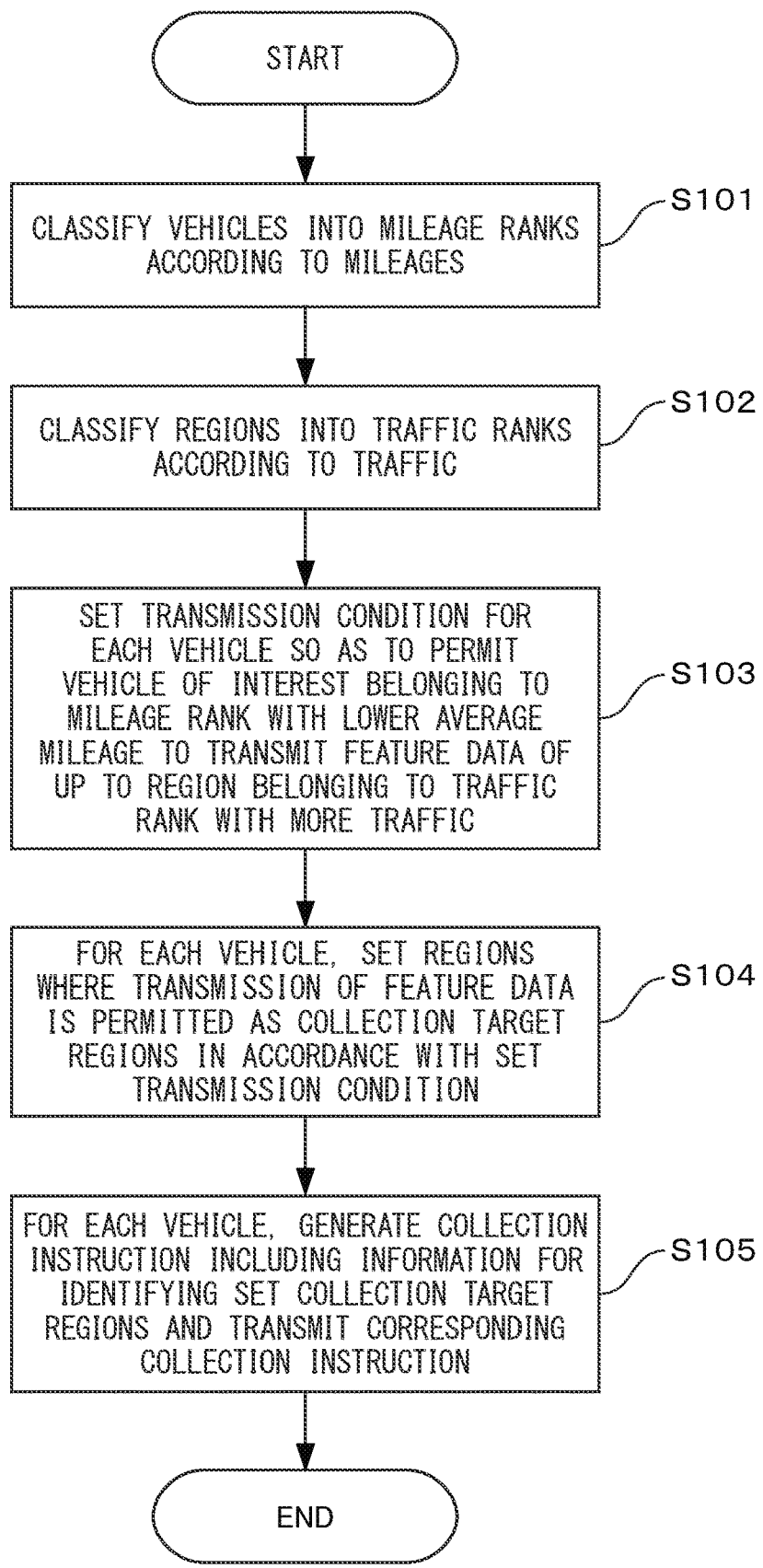
FIG. 7 is an operation flowchart of the feature data collection process.

FIG. 7 is an operation flowchart of the feature data collection process in the server 3. The processor 34 of the server 3 executes the feature data collection process in accordance with this operation flowchart at predetermined intervals.

The vehicle classification unit 41 of the processor 34 classifies the vehicles 2 into mileage ranks according to the mileages of the vehicles 2 in a preceding predetermined period (step S101). The region classification unit 42 of the processor 34 classifies target regions for collecting feature data into traffic ranks according to the traffic in the regions (step S102).

The transmission condition setting unit 43 of the processor 34 sets a transmission condition of feature data for each vehicle 2 so as to permit a vehicle 2 of interest belonging to a mileage rank with a lower average mileage to transmit feature data of up to a region belonging to a traffic rank with more traffic (step S103). For each vehicle 2, the transmission condition setting unit 43 then sets some of the regions where the vehicle 2 is permitted to transmit feature data as collection target regions in accordance with the set transmission condition (step S104).

For each vehicle 2, the notification unit 44 of the processor 34 generates a collection instruction including information for identifying the set collection target regions, and transmits the collection instruction to the vehicle 2 via the communication interface 31 (step S105). Thereafter, the processor 34 terminates the feature data collection process.

As has been described above, the apparatus for collecting feature data sets a transmission condition for permitting transmission of feature data for each of vehicles capable of generating and transmitting feature data so that the transmission condition for a vehicle with a lower mileage in a preceding predetermined period is more relaxed. The apparatus then notifies each vehicle via a communication unit of a collection instruction to instruct the vehicle to collect the feature data under the set transmission condition. Thus the apparatus can equalize the amount of transmitted feature data among vehicles. In particular, the apparatus ranks target regions for collecting feature data according to traffic, and permits a vehicle with a lower mileage to transmit feature data of up to a region belonging to a traffic rank with more traffic. As a result, the apparatus permits a vehicle with a high mileage to transmit feature data of a region with little traffic, and thus can prevent difficulty in collecting feature data of roads with little traffic, i.e., roads whose feature data is not easily collected, from increasing. Additionally, the apparatus generates a collection instruction for each vehicle according to the traffic in each region and the mileage of each vehicle, and thus need not manage the number of pieces of received feature data on a vehicle-by-vehicle basis. This reduces the load of the apparatus.

According to a modified example, whenever receiving feature data, the processor 34 of the server 3 may store the received feature data in the storage device 32 in association with the identifying information of the vehicle 2 having transmitted the feature data and the received date and time. Additionally, the vehicle classification unit 41 may count the amount of feature data transmitted in a preceding predetermined period for each vehicle 2. The vehicle classification unit 41 then classifies the vehicles 2 into multiple ranks according to the amount of feature data transmitted in the preceding predetermined period (these ranks will hereafter be referred to as "amount-of-data ranks" for convenience of description). For example, the vehicle classification unit 41 sets the boundaries of the amount-of-data ranks so that each amount-of-data rank includes the same number of vehicles 2. For example, when classifying the vehicles 2 into three amount-of-data ranks, the vehicle classification unit 41 classifies the vehicles 2 into first to third amount-of-data ranks in ascending order of the amount of transmitted feature data so that each rank includes one-third of all the vehicles 2.

In this modified example, the transmission condition setting unit 43 sets a transmission condition of feature data for each vehicle 2 so that, of the vehicles 2, the transmission condition for a vehicle 2 having transmitted a smaller amount of feature data in the preceding predetermined period is more relaxed. For example, the transmission condition setting unit 43 permits a vehicle 2 of interest belonging to an amount-of-data rank to transmit feature data of up to a region belonging to a traffic rank with more traffic as the average of the amounts of feature data transmitted by the respective vehicles in the amount-of-data rank (hereafter, the "average amount of transmission") is smaller.

According to this modified example, since the transmission condition for a vehicle having transmitted a smaller amount of feature data is more relaxed, the apparatus for collecting feature data can equalize the amount of transmitted feature data among vehicles. In this modified example also, the apparatus permits a vehicle having transmitted a large amount of feature data to transmit of feature data of a region with little traffic, and thus can prevent difficulty in collecting feature data of roads with little traffic from increasing.

According to another modified example, target regions for collecting feature data may be set for each vehicle 2, based on the amounts of feature data received for the respective collection target regions.

In this case, a target amount of feature data to be collected is set for each region. The target amount may be set at the same value or different values for the regions. For each region, the region classification unit 42 counts the amount of feature data received in a preceding predetermined period, and calculates the ratio of the amount of received feature data to the target amount as an adequacy level. The region classification unit 42 classifies the regions into multiple ranks according to the adequacy levels of the respective regions (these ranks will hereafter be referred to as "adequacy-level ranks" for convenience of description). For example, the region classification unit 42 sets as many adequacy-level ranks as the mileage ranks or the amount-of-data ranks. Alternatively, the region classification unit 42 may set the adequacy-level ranks so that the number thereof differs from that of mileage ranks and that of amount-of-data ranks. The region classification unit 42 classifies the regions into the adequacy-level ranks in ascending order of adequacy level so that each adequacy-level rank includes the same numbers of regions. The region classification unit 42 may classify the regions into the adequacy-level ranks in ascending order of adequacy level so that each adequacy-level rank includes a different number of regions.

In this case, the transmission condition setting unit 43 sets a transmission condition so as to permit a vehicle 2 with a lower mileage or a vehicle having transmitted a smaller amount of feature data to transmit feature data of up to a region with a higher adequacy level. For example, the transmission condition setting unit 43 permits a vehicle 2 of interest belonging to a mileage rank with a lower average mileage to transmit feature data of up to a region belonging to an adequacy-level rank with a higher adequacy level. Alternatively, the transmission condition setting unit 43 permits a vehicle 2 of interest belonging to an amount-of-data rank with a less average amount of transmission to transmit feature data of up to a region belonging to an adequacy-level rank with a higher adequacy level.

According to this modified example, the apparatus for collecting feature data permits a vehicle 2 with a lower mileage or a vehicle 2 having transmitted a smaller amount of feature data to transmit feature data of up to a region with a higher adequacy level. In other words, transmission of feature data of a region with a lower adequacy level is more easily permitted. For this reason, the apparatus can equalize the amount of feature data transmitted from each vehicle, and prevent difficulty in collecting feature data from increasing regarding a region where the adequacy level is low, i.e., where it is difficult to collect a necessary number of pieces of feature data.

According to still another modified example, the transmission condition setting unit 43 may set a transmission condition for each vehicle 2 so as to permit, of the vehicles 2, a vehicle 2 with a higher mileage to transmit feature data only in a more restricted time of day. Similarly, the transmission condition setting unit 43 may set a transmission condition for each vehicle 2 so as to permit, of the vehicles 2, a vehicle 2 having transmitted a larger amount of feature data in a preceding predetermined period to transmit feature data only in a more restricted time of day. For example, the transmission condition setting unit 43 shortens the time of day when a vehicle 2 of interest is permitted to transmit feature data as the average mileage of a mileage rank to which the vehicle belongs increases. In particular, the time of day when a vehicle is permitted to transmit feature data is preferably set at a time of day when the amount of communication through the communication network 4 is relatively small.

In this modified example also, the apparatus for collecting feature data can equalize the amount of transmitted feature data among vehicles. In this modified example, the process of the region classification unit 42 may be omitted because the transmission condition is set independently of the regions. For this reason, the processing load of the apparatus is reduced.

According to yet another modified example, the transmission condition setting unit 43 may set a transmission condition for each vehicle 2 so that, of the vehicles 2, a vehicle 2 with a higher mileage can transmit a fewer types of feature data. Similarly, the transmission condition setting unit 43 may set a transmission condition for each vehicle 2 so that, of the vehicles 2, a vehicle 2 having transmitted a larger amount of feature data in a preceding predetermined period can transmit a fewer types of feature data. In this case, the type of feature data to be collected is specified for each region, each type of road (e.g., an ordinary road or an expressway), or each road structure (e.g., a straight road, an intersection, or a junction), and notified to each vehicle 2 in advance. For example, when the mileage of a vehicle 2 of interest in the preceding predetermined period is not less than a predetermined distance, the transmission condition setting unit 43 restricts the types of feature data that the vehicle 2 can transmit to data representing the type of feature only. In contrast, when the mileage of a vehicle 2 of interest in the preceding predetermined period is less than the predetermined distance, the transmission condition setting unit 43 permits the vehicle 2 to transmit a sub-image and a whole image as well as data representing the type of feature.

Alternatively, when the amount of feature data transmitted by a vehicle 2 of interest in the preceding predetermined period is not less than a predetermined amount, the transmission condition setting unit 43 restricts the types of feature data that the vehicle 2 can transmit to data representing the type of feature only. In contrast, when the amount of feature data transmitted by a vehicle 2 of interest in the preceding predetermined period is less than the predetermined amount, the transmission condition setting unit 43 permits the vehicle 2 to transmit a sub-image and a whole image as well as data representing the type of feature.

In this modified example also, the apparatus for collecting feature data can equalize the amount of transmitted feature data among vehicles. According to this modified example, the apparatus can set a transmission condition so as to permit each vehicle to transmit feature data of a particularly desired type, and thus can prevent collection of such a type of feature data from being inhibited.

The computer program for causing a computer to achieve the functions of the units included in the processor of the apparatus for collecting feature data according to the embodiment or modified examples may be provided in a form recorded on a computer-readable recording medium. The computer-readable recording medium may be, for example, a magnetic recording medium, an optical recording medium, or a semiconductor memory.

As described above, those skilled in the art may make various modifications according to embodiments within the scope of the present invention.

What is claimed is:

1. An apparatus for collecting feature data, comprising:
 a memory storing a map and configured to store, on the map and for each of vehicles, a mileage of the vehicle or an amount of feature data transmitted by the vehicle and representing a feature related to travel of the vehicle;
 one or more processors configured to:
  determine, of the vehicles, a mileage that a vehicle has traveled during a feature data collecting trip and an amount of feature data the vehicle has transmitted during the feature data collecting trip,
  set a transmission condition for permitting transmission of the feature data for each of the vehicles so that, of the vehicles, the transmission condition for a vehicle with a lower mileage or a vehicle having transmitted a smaller amount of the feature data is more relaxed and is permitted to transmit the feature data of a larger geographical area in order to equalize an amount of transmitted feature data among the vehicles by permitting the vehicle with the lower mileage or the vehicle having transmitted the smaller amount of the feature data to transmit feature data of a region with more traffic and by permitting a vehicle with a higher mileage or a vehicle having transmitted a larger amount of the feature data to transmit feature data of a region with less traffic, and thus prevent difficulty in collecting feature data of roads with little traffic and reduce a load on the apparatus because the one or more processors do not need to manage the number of pieces of received feature data on a vehicle-by-vehicle basis, and
  update the map stored in the memory regarding the mileage of the vehicle or the amount of feature data transmitted by the vehicle and representing the feature related to travel of the vehicle; and
 a connecting portion connectable to the vehicles via a communication network, the one or more processors being configured to notify each of the vehicles via the connection portion of a collection instruction to instruct the vehicle to collect the feature data under the transmission condition set for the vehicle.

2. The apparatus according to claim 1, wherein the one or more processors set the transmission condition so as to permit, of the vehicles, a vehicle with a lower mileage or a vehicle having transmitted a smaller amount of the feature data to transmit the feature data of up to a region with more traffic of target regions for collecting the feature data.

3. The apparatus according to claim 2, wherein the one or more processors are further configured to:
 classify the vehicles into mileage ranks according to mileages of the vehicles, and
 classify the regions into traffic ranks according to traffic in the regions, wherein
 the one or more processors set the transmission condition for each of the vehicles so as to permit a vehicle belonging to one of the mileage ranks with a lower average mileage to transmit the feature data of up to a region belonging to one of the traffic ranks with more traffic.

4. The apparatus according to claim 1, wherein for each of target regions for collecting the feature data, the memory further stores the amount of the feature data received from any of the vehicles in a predetermined period and a target amount of the feature data to be collected, and
 the one or more processors set the transmission condition so as to permit, of the vehicles, a vehicle with a lower mileage or a vehicle having transmitted a smaller amount of the feature data to transmit the feature data of up to one of the regions regarding which the ratio of the amount of the received feature data to the target amount is higher.

5. A method for collecting feature data, comprising:
 storing a map in a memory, the memory being configured to store, on the map and for each of vehicles, a mileage of the vehicle or an amount of feature data transmitted by the vehicle and representing a feature related to travel of the vehicle;
 setting a transmission condition for permitting transmission of feature data for each of vehicles so that, of the vehicles, the transmission condition for a vehicle with a lower mileage or a vehicle having transmitted a smaller amount of the feature data is more relaxed and is permitted to transmit the feature data of a larger geographical area in order to equalize an amount of transmitted feature data among the vehicles by permitting the vehicle with the lower mileage or the vehicle having transmitted the smaller amount of the feature data to transmit feature data of a region with more traffic and by permitting a vehicle with a higher mileage or a vehicle having transmitted a larger amount of the feature data to transmit feature data of a region with less traffic, and thus prevent difficulty in collecting feature data of roads with little traffic and reduce a load because one or more processors do not need to manage the number of pieces of received feature data on a vehicle-by-vehicle basis;
 updating the map stored in the memory regarding the mileage of the vehicle or the amount of feature data transmitted by the vehicle and representing the feature related to travel of the vehicle; and
 notifying each of the vehicles via a connection portion of a collection instruction to instruct the vehicle to collect the feature data under the transmission condition set for the vehicle, the connecting portion connectable to the vehicles via a communication network.

6. A non-transitory recording medium that stores a computer program for collecting feature data, the computer program causing a computer to execute a process comprising:

storing a map in a memory, the memory being configured to store, on the map and for each of vehicles, a mileage of the vehicle or an amount of feature data transmitted by the vehicle and representing a feature related to travel of the vehicle;

setting a transmission condition for permitting transmission of feature data for each of vehicles so that, of the vehicles, the transmission condition for a vehicle with a lower mileage or a vehicle having transmitted a smaller amount of the feature data is more relaxed and is permitted to transmit the feature data of a larger geographical area in order to equalize an amount of transmitted feature data among the vehicles by permitting the vehicle with the lower mileage or the vehicle having transmitted the smaller amount of the feature data to transmit feature data of a region with more traffic and by permitting a vehicle with a higher mileage or a vehicle having transmitted a larger amount of the feature data to transmit feature data of a region with less traffic, and thus prevent difficulty in collecting feature data of roads with little traffic and reduce a load because one or more processors do not need to manage the number of pieces of received feature data on a vehicle-by-vehicle basis;

updating the map stored in the memory regarding the mileage of the vehicle or the amount of feature data transmitted by the vehicle and representing the feature related to travel of the vehicle; and notifying each of the vehicles via a connection portion of a collection instruction to instruct the vehicle to collect the feature data under the transmission condition set for the vehicle, the connecting portion connectable to the vehicles via a communication network.

* * * * *